United States Patent
Kwak et al.

(10) Patent No.: US 7,733,832 B2
(45) Date of Patent: Jun. 8, 2010

(54) METHOD AND APPARATUS FOR TRANSMITTING/RECEIVING CONTROL INFORMATION OF USER EQUIPMENT FOR UPLINK DATA TRANSMISSION

(75) Inventors: Yong-Jun Kwak, Yongin-si (KR); Himke Van Der Velde, Middlesex (GB); Gert Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 595 days.

(21) Appl. No.: 11/546,573

(22) Filed: Oct. 12, 2006

(65) Prior Publication Data

US 2007/0109964 A1  May 17, 2007

(30) Foreign Application Priority Data

Oct. 12, 2005  (KR)  ............... 10-2005-0096295

(51) Int. Cl.
*H04L 12/26* (2006.01)
*H04B 7/216* (2006.01)

(52) U.S. Cl. .................. 370/335; 370/230; 370/342

(58) Field of Classification Search ............ 455/522, 455/450, 442, 425; 370/329, 335, 337
See application file for complete search history.

(56) References Cited

U.S. PATENT DOCUMENTS

| 2003/0147370 | A1 | 8/2003 | Wu |
| 2004/0165554 | A1 | 8/2004 | Chao et al. |
| 2005/0043062 | A1 | 2/2005 | Ahn et al. |
| 2005/0047416 | A1* | 3/2005 | Heo et al. ............ 370/395.4 |
| 2005/0079865 | A1 | 4/2005 | Ahn et al. |

(Continued)

FOREIGN PATENT DOCUMENTS

RU  2237365  9/2004

(Continued)

OTHER PUBLICATIONS

"Universal Mobile Telecommunications System (UMTS)", ETSI Standards, European Telecommunications Standards Institute, Sophia-Antipo, FR, vol. 3-R2, No. V660, Sep. 2005, XP014031931 ISSN: 0000-0001 pp. 72-76, paragraphs 11.8.1.3.1, 11.8.1.4, 11.8.1.5.

(Continued)

*Primary Examiner*—George Eng
*Assistant Examiner*—Nizar Sivji
(74) *Attorney, Agent, or Firm*—Roylance, Abrams, Berdo & Goodman, L.L.P.

(57) ABSTRACT

A method and apparatus for transmitting a happy bit indicating whether a UE needs additional resources for uplink data transmission in a mobile communication system supporting an uplink packet data service are provided. The UE sets a happy bit for a current process based on a different criterion, depending on the current process is an active process activated for scheduled transmission or an inactive process allowed for non-scheduled transmission. A Node B interprets happy bits received for a plurality of processes and interprets them according to the types of the processes. Then the Node B determines an allowed maximum data rate and the number of active processes for the UE and schedules uplink data transmission for the UE according to the determination result.

23 Claims, 12 Drawing Sheets

U.S. PATENT DOCUMENTS

2005/0207374 A1 9/2005 Petrovic et al.
2005/0249148 A1 11/2005 Nakamata et al.
2006/0215604 A1* 9/2006 Mueckenheim et al. ..... 370/329

FOREIGN PATENT DOCUMENTS

WO WO02080406 10/2002

OTHER PUBLICATIONS

Lge et al: "R2-052358 Criteria for the Happy Bit"; 3GPP TSG-RAN WG2 Meeting #48BIS, XX, XX, Oct. 3, 2005, pp. 1-3, XP002362101.

"Universal Mobile Telecommunications System (UMTS)", ETSI Standards, European Telecommunications Standards Institute, Sophia-Antipo, FR, vol. 3-R2, No. V620, Mar. 2005, XP014027653 ISSN: 0000-0001 pp. 25-26, paragraphs 9.3.1.2, 10.

$3^{rd}$ Generation Partnership Project; Technical Specification Group Radio Access Network; Medium Access Control (MAC) protocol specification (Release 6).

3GPP TS 25.308 V5.7.0; $3^{rd}$ Generation Partnership Project, Technical Specification Group Radio Access Network, High Speed Downlink Packet Access (HSDPA), Overall description, Stage 2 (Release 5); Dec. 21, 2004.

* cited by examiner (REALTED ART)

(REALTED ART)

(REALTED ART)

(REALTED ART)

METHOD AND APPARATUS FOR TRANSMITTING/RECEIVING CONTROL INFORMATION OF USER EQUIPMENT FOR UPLINK DATA TRANSMISSION

CROSS REFERENCE TO RELATED APPLICATION

This application claims the benefit under 35 U.S.C. §119 (a) to an application filed in the Korean Intellectual Property Office on Oct. 12, 2005 and assigned Serial No. 2005-96295, the entire disclosure contents of which is herein incorporated by reference.

BACKGROUND OF THE INVENTION

1. Field of the Invention

The present invention relates to a mobile communication system for supporting uplink data transmission. More particularly, the present invention relates to a method and apparatus for transmitting/receiving control information about the uplink transmission status of a User Equipment (UE), required for Node B scheduling of uplink data transmission.

2. Description of the Related Art

A 3rd generation mobile communication system using Wideband Code Division Multiple Access (WCDMA) based on the European Global System for Mobile communications (GSM) system, and Universal Mobile Telecommunication Service (UMTS) provides mobile subscribers or computer users with a uniform service of transmitting packet-based text, digitized voice, and video and multimedia data at or above 2Mbps regardless of their locations around the world. The concept of virtual access has allowed the UMTS system to access any end point within a network at any time. Virtual access refers to packet-switched access using a packet protocol similar to Internet Protocol (IP).

FIG. 1 illustrates the configuration of the UMTS Terrestrial Radio Access Network (UTRAN) in a conventional UMTS system.

Referring to FIG. 1, a UTRAN 12 includes Radio Network Controllers (RNCs) 16a and 16b and Node Bs 18a to 18d, and connects a UE 20 to a Core Network (CN) 10. A plurality of cells may underlie the Node Bs 18a to 18d. Each RNC 16a or 16b controls its underlying Node Bs and each Node B controls its underlying cells. An RNC, Node Bs and cells under the control of the RNC collectively form a Radio Network Subsystem (RNS) 14a or 14b.

The RNCs 16a and 16b each allocate or manage radio resources to the Node Bs 18a to 18d under their control. The Node Bs 18a to 18d function to actually provide the radio resources. The radio resources are configured on a cell basis and the radio resources provided by the Node Bs 18a to 18d refer to radio resources of the cells that they manage. The UE establishes a radio channel using radio resources provided by a particular cell under a particular Node B for communications. According to the UE, a distinction between the Node Bs 18a to 18d and their controlled cells is meaningless and the UE 20 deals only with a physical layer configured on a cell basis. Therefore, the terms "Node B" and "cell" are interchangeably used herein.

A Uu interface is defined between a UE and an RNC. The hierarchical protocol architecture of the Uu interface is illustrated in detail in FIG. 2. This interface is divided into a control plane (C-plane) 30 for exchanging control signals between the UE and the RNC and a user plane (U-plane) 32 for transmitting actual data.

Referring to FIG. 2, a Radio Resource Control (RRC) layer 34, a Radio Link Control (RLC) layer 40, a Medium Access Control (MAC) layer 42, and a physical (PHY) layer 44 are defined on the C-plane 30. A Packet Data Control Protocol (PDCP) layer 36, a Broadcast/Multicast Control (BMC) layer 38, the RLC layer 40, the MAC layer 42, and the PHY layer 44 are defined on the U-plane 32. The PHY layer 44 resides in each cell and the MAC layer 42 through the RRC layer 34 are configured in each RNC. The UE has all layers.

The PHY layer 44 provides an information delivery service by a radio transfer technology, corresponding to Layer 1 (L1) in an Open System Interconnection (OSI) model. The PHY layer 44 is connected to the MAC layer 42 via transport channels. Data processing in the PHY layer 44 determines the mapping relationship between the transport channels and physical channels.

The MAC layer 42 is connected to the RLC layer 40 via logical channels. The MAC layer 42 delivers data received from the RLC layer 40 on the logical channels to the PHY layer 44 on appropriate transport channels, and delivers data received from the PHY layer 44 on the transport channels to the RLC layer 40 on appropriate logical channels. The MAC layer 42 inserts additional information or interprets inserted data in data received on the logical channels and controls random access. A U-plane-related section is called MAC-data (MAC-d) and a C-plane-related section is called MAC-control (MAC-c) in the MAC layer 42.

The RLC layer 40 controls the establishment and release of the logical channels. The RLC layer 40 operates in an Acknowledged Mode (AM), an Unacknowledged Mode (UM) or a Transparent Mode (TM) and provides different functionalities in those modes. Typically, the RLC layer 40 segments or concatenates Service Data Units (SDUs) received from an upper layer to an appropriate size, and corrects errors.

The PDCP layer 36 resides above the RLC layer 40 in the U-plane 32. The PDCP layer 36 is responsible for compression and decompression of the header of data carried in the form of an IP packet and data delivery with integrity in the case where a serving RNC is changed due to the UE's mobility.

The characteristics of the transport channels that connect the PHY layer 44 to the upper layers depend on Transport Format (TF) that defines a PHY layer process including convolutional channel encoding, interleaving, and service-specific rate matching.

Particularly, the UMTS system uses an Enhanced Uplink Dedicated Channel (E-DCH) with the aim to improve packet transmission performance on the uplink from UEs to a Node B. To support more stable high-speed data transmission, the E-DCH utilizes Hybrid Automatic Retransmission request (HARQ) and Node B-controlled scheduling.

FIG. 3 illustrates typical uplink packet data transmission on the E-DCH via radio links. Reference numeral 100 denotes a Node B that supports the E-DCH and reference numerals 101 to 104 denote UEs that transmit the E-DCH.

Referring to FIG. 3, the Node B 100 evaluates the channel statuses of the UEs 101 to 104 and schedules their uplink data transmissions based on the channel statuses. The scheduling is performed such that a noise rise measurement does not exceed a target noise rise in the Node B 100 in order to increase total system performance. Therefore, the Node B 100 allocates a low data rate to a remote UE 104 and a high data rate to a nearby UE 101.

FIG. 4 is a diagram illustrating a typical signal flow for message transmission on the E-DCH.

Referring to FIG. 4, a Node B and a UE establish an E-DCH in step 202. Step 202 involves message transmission on dedicated transport channels. The UE transmits scheduling information to the Node B in step 204. The scheduling information may contain uplink channel status information which is the transmit power and power margin of the UE, and the amount of buffered data to be transmitted to the Node B.

In step 206, the Node B monitors scheduling information from a plurality of UEs to schedule uplink data transmissions for the individual UEs. The Node B decides to approve an uplink packet transmission from the UE and transmits scheduling assignment information to the UE in step 208. The scheduling assignment information may include a granted rate and an allowed timing.

In step 210, the UE determines the TF of the E-DCH based on the scheduling assignment information. The UE then transmits uplink packet data on an Enhanced-Dedicated Physical Data Channel (E-DPDCH) to which the E-DCH is mapped in step 214. The UE simultaneously transmits TF information to the Node B on an Enhanced-Dedicated Physical Control Channel (E-DPCCH) associated with the E-DCH in step 212. The Node B determines whether the TF information and the uplink packet data have errors in step 216. In the presence of errors in either of the TF information and the uplink packet data, the Node B transmits a Non-acknowledgement (NACK) signal on an ACK/NACK channel to the UE. When there are no errors in the TF information or the uplink packet data, the Node B transmits an ACK signal to the UE on the ACK/NACK channel in step 218.

In the latter case, the packet data transmission is completed and the UE transmits new packet data to the Node B on the E-DCH. Alternatively, the UE retransmits the same packet data to the Node B on the E-DCH.

As described above, the E-DCH is mapped to the E-DPDCH for channel encoding and modulation of transmission data. Control information about the E-DCH is transmitted simultaneously with transmission of the E-DCH on the E-DPCCH and the E-DPDCH. The E-DCH control information is scheduling information and TF information. The scheduling information represents the UE status, required for the Node B to schedule the uplink data transmission for the UE. The scheduling information is the UE's buffer status information and the uplink channel status information. Another piece of control information called a "Happy Bit" indicates the current UE's status. The TF information includes the data rate of the transmitted E-DCH data, HARQ operation information, and Quality of Service (QoS) information. The RF information is transmitted simultaneously with the E-DCH data.

The buffer status information and the uplink channel status information are transmitted together with the E-DCH data in a MAC-e Protocol Data Unit (PDU) on the E-DPDCH. Alternatively, the TF information and the "Happy Bit" are transmitted on the E-DPCCH associated with the E-DPDCH. The "Happy Bit" usually indicates whether the UE is satisfied with the allowed data rate set by scheduling, and it is always transmitted in the presence of E-DCH data. To improve the efficiency of uplink data transmission, a technique for differentially setting and interpreting the "Happy Bit" according to the transmission status of the UE is needed.

Accordingly, there is a need for an improved system and method to efficiently transmit control information about uplink packet data of a UE for use in uplink data transmission scheduling in a Node B.

SUMMARY OF THE INVENTION

An aspect of exemplary embodiments of the present invention is to substantially solve at least the above problems and/or disadvantages and to provide at least the advantages described below. Accordingly, an aspect of exemplary embodiments of the present invention provides a method and apparatus to efficiently transmit control information about uplink packet data of a UE for use in uplink data transmission scheduling in a Node B.

An exemplary embodiment of the present invention provides a method and apparatus to set and interpret control information according to the conditions of uplink packet transmission.

An exemplary embodiment of the present invention also provides a method and apparatus to efficiently set and interpret a Happy Bit sent by a UE while uplink data is transmitted on an E-DCH in an asynchronous WCDMA communication system.

According to one aspect of an exemplary embodiment of the present invention, in a method of transmitting control information for uplink data transmission in a UE, the UE determines whether a current process to deliver uplink data on an E-DCH is an active process activated for scheduled transmission. If the current process is activated, the UE determines whether the current process meets a predetermined first criterion. If the first criterion is met, the UE sets a happy bit to indicate whether the UE needs additional resources to be "unhappy". The UE transmits control information including the happy bit to a Node B on an E-DPCCH associated with an E-DPDCH, and the uplink data on the E-DPDCH in the active process. The first criterion is that the UE has adequate power available to transmit at a higher data rate than a current data rate, scheduled transmission of buffered data in the UE requires more than a predetermined time delay, and the UE can transmit E-DCH data at an allowed maximum data rate indicated by a serving grant.

According to another aspect of an exemplary embodiment of the present invention, in a method of receiving control information of a UE for uplink data transmission, uplink data and control information associated with the uplink data is received from the UE. A happy bit included in the control information with respect to a process in which the uplink data has been received is stored. The happy bit indicates whether the UE needs additional resources. Happy bits stored with respect to a plurality of processes set with the UE are interpreted if the processes are activated for scheduled transmission or processes for non-scheduled transmission while deactivating, and an allowed maximum data rate and the number of active processes for the UE are determined. Uplink data transmission is scheduled for the UE according to the determined allowed maximum data rate and the determined number of active processes, and a scheduling grant indicating a scheduling result is transmitted to the UE.

According to a further aspect of an exemplary embodiment of the present invention, an active process controller determines whether a current process to deliver uplink data on an E-DCH is an active process activated for scheduled transmission. This determination is made by using an apparatus for transmitting control information for uplink data transmission in a UE. A controller information decider determines whether the current process meets a predetermined first criterion. If the current process is activated for scheduled transmission, the controller information decider sets a happy bit to "unhappy", if the first criterion is met. The happy bit indicates whether additional resources are required by the UE. A data channel transmitter includes a plurality of processes for transmitting uplink data on the E-DCH and transmits the uplink data on an E-DPDCH in the active process. A control channel transmitter transmits control information including the happy bit to a Node B on an E-DPCCH associated with an E-DPDCH, simultaneously with the transmission of the uplink data. Here, the first criterion is that the UE has adequate power available to transmit at a higher data rate than a current data rate, scheduled transmission of buffered data in the UE requires more than a predetermined time delay, and the UE can transmit E-DCH data at an allowed maximum data rate indicated by a serving grant.

According to still another aspect of an exemplary embodiment of the present invention, in an apparatus for receiving control information of a UE for uplink data transmission in a Node B, a receiver receives uplink data and control information associated with the uplink data from the UE. A memory stores a happy bit included in the control information with respect to a process in which the uplink data has been received. The happy bit indicates whether the UE needs additional resources. A UE status decider interprets happy bits stored with respect to a plurality of processes set with the UE if the processes are activated for scheduled transmission or processes for non-scheduled transmission while deactivating. The UE status decider also determines an allowed maximum data rate and the number of active processes for the UE. A scheduling grant generator schedules uplink data transmission for the UE according to the determined allowed maximum data rate and the determined number of active processes. The scheduling grant generator also generates a scheduling grant indicating a scheduling result. A transmitter transmits the scheduling grant to the UE.

Other objects, advantages and salient features of the invention will become apparent to those skilled in the art form the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following detailed description when taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention is intended to provide a criterion for setting a Happy Bit representing the transmission status of a UE in both a Scheduled Transmission (ST) mode and Non-Scheduled Transmission (NST) mode in a mobile communication system where uplink data is transmitted based on Node B-controlled scheduling.

To request scheduling of uplink data transmission, a UE transmits scheduling information, TF information, and a Happy Bit to a Node B. The scheduling information is transmitted together with E-DCH data in a MAC-E PDU on the E-DPDCH, while the TF information and the Happy Bit are transmitted on the E-DPCCH dependent on the E-DPDCH.

Figure 1:
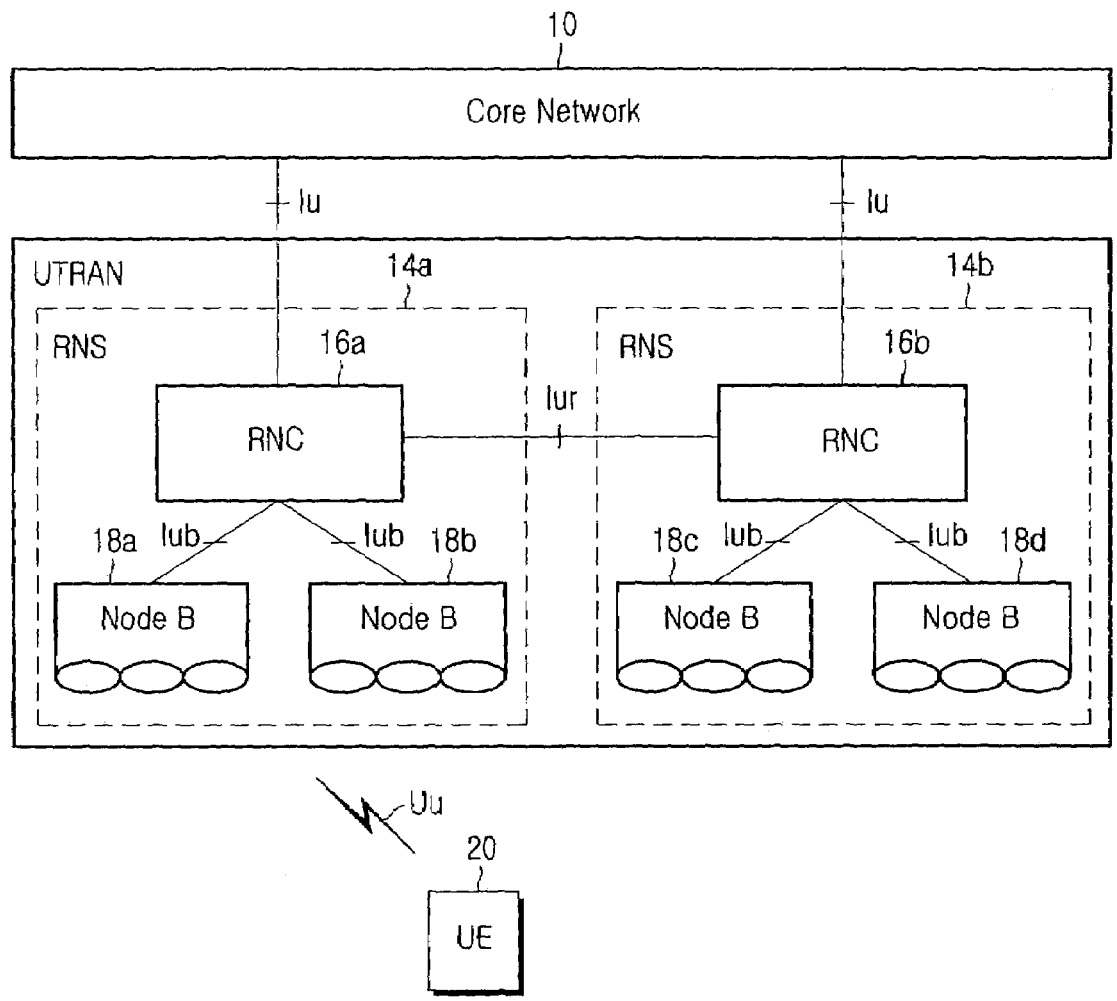
FIG. 1 illustrates the configuration of a UTRAN in a typical UMTS system.
Figure 2:
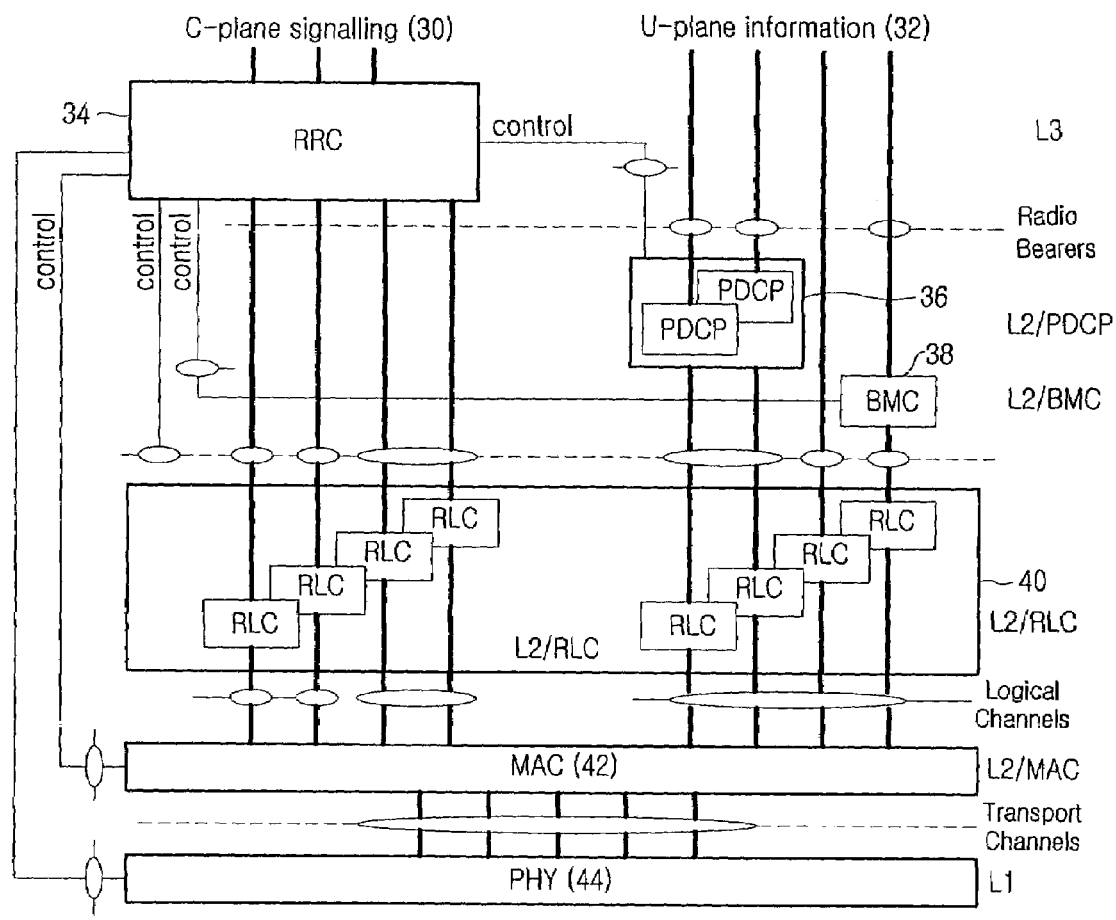
FIG. 2 illustrates the hierarchical architecture of an interface defined between a UE and an RNC.
Figure 3:
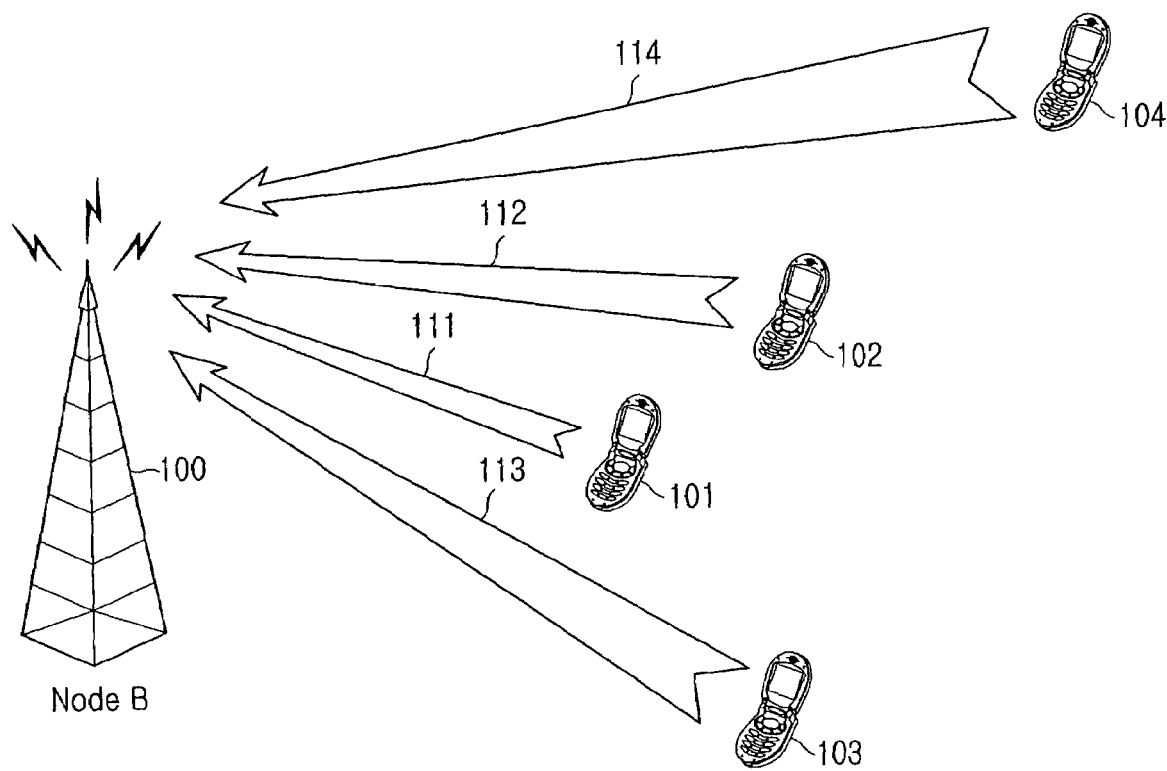
FIG. 3 illustrates a conventional E-DCH transmission via a radio link.
Figure 4:
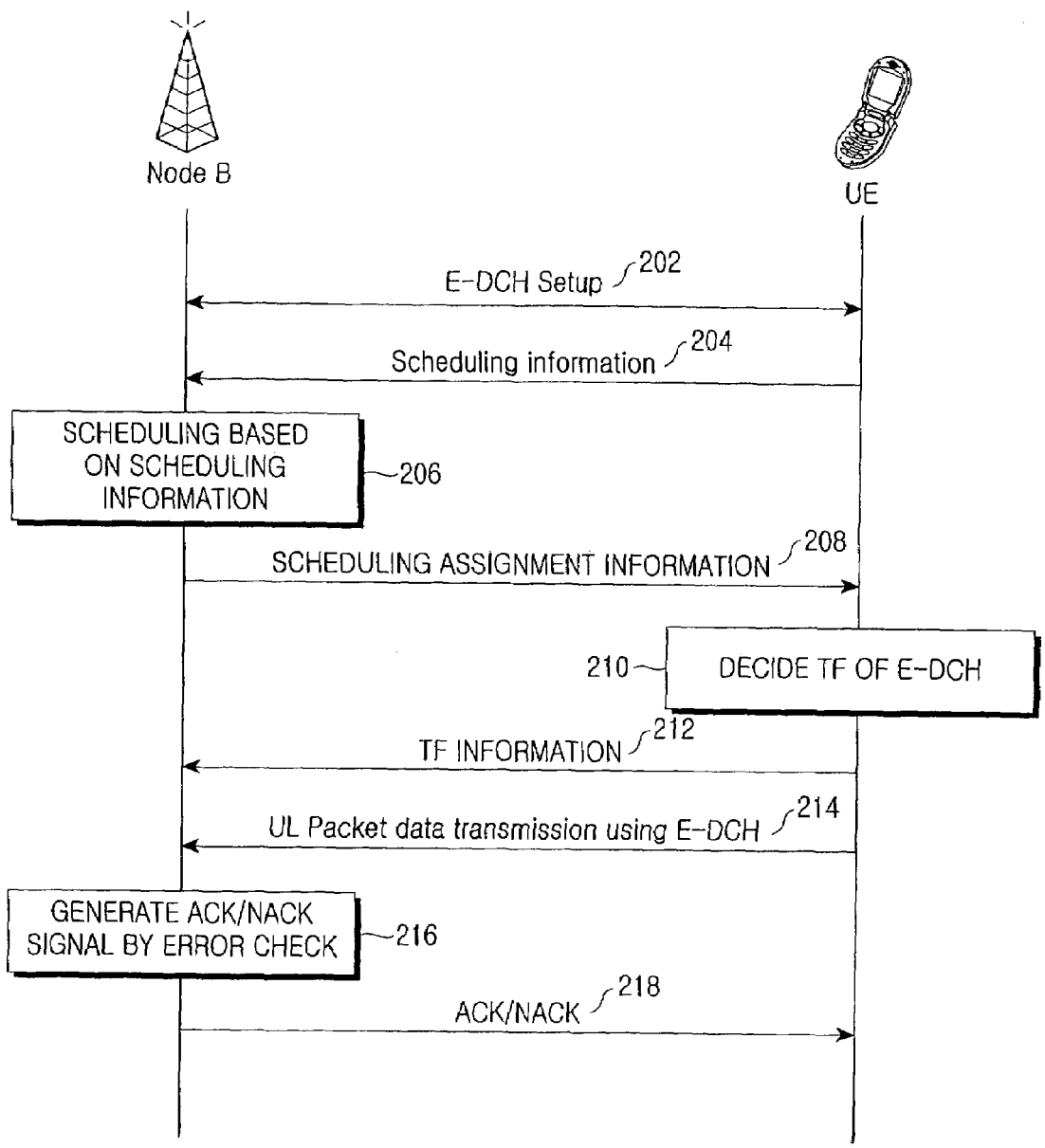
FIG. 4 is a diagram illustrating a conventional signal flow for message transmission/reception on an E-DCH.
Figure 5:
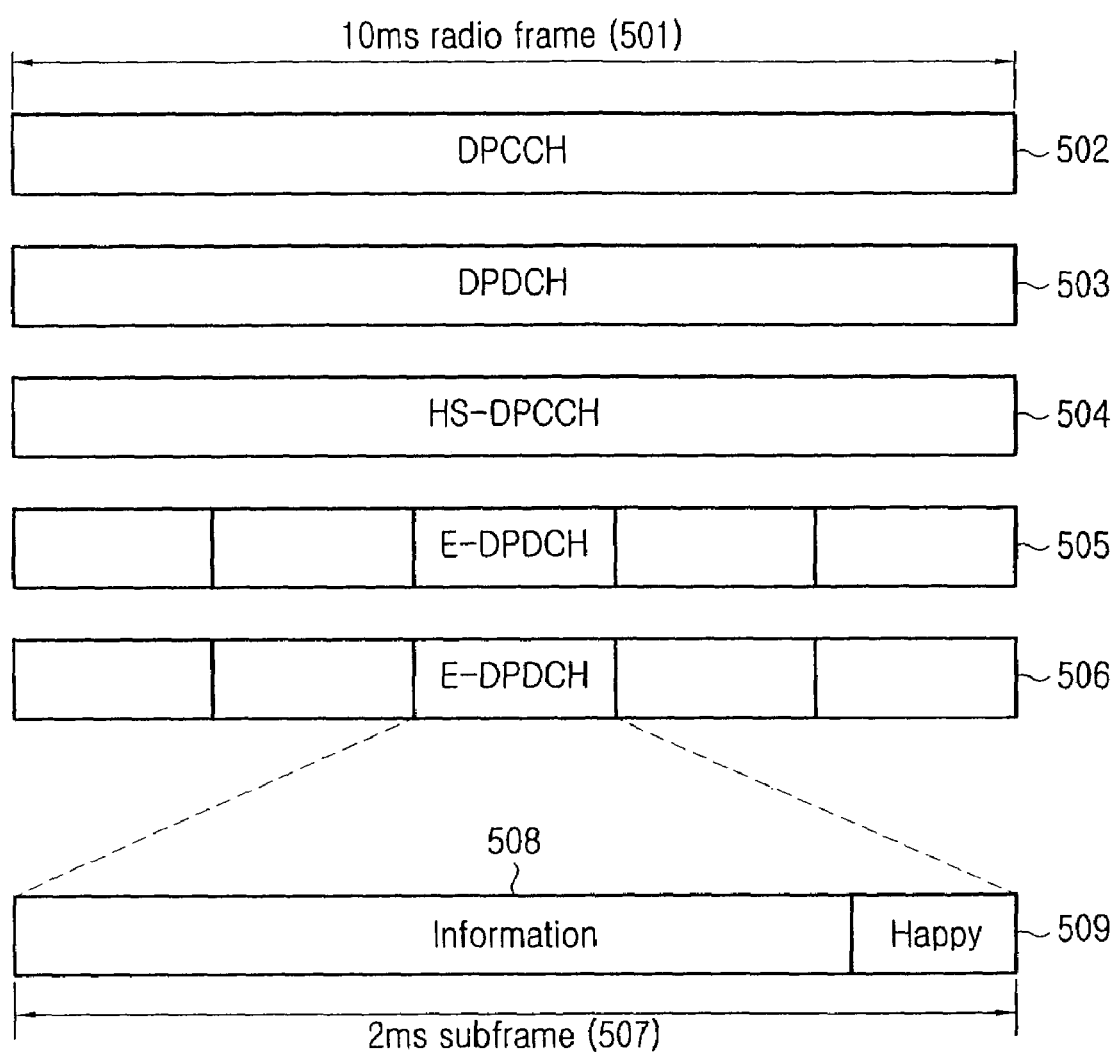
FIG. 5 illustrates the structures of physical channels associated with the E-DCH.

FIG. 5 illustrates the structures of physical channels associated with the E-DCH.

Referring to FIG. 5, reference numerals 502 and 503 denote a DPCCH and a DPDCH supporting a typical uplink dedicated service, respectively. The Transport Time Interval (TTI) of the DPCCH 502 and the DPDCH 503 is equal to a 10-ms radio frame 501 in duration. There is also a High Speed-DPCCH (HS-DPCCH) 504 configured to support High Speed Downlink Packet Access (HSDPA). For an E-DCH service, an E-DPDCH 505 and an E-DPCCH 506 are used. The TTI of the E-DPDCH 505 and E-DPCCH 506 is 10 ms or 2 ms. Therefore, the 10-ms radio frame 501 is divided into five 2-ms subframes 507 for the E-DPDCH 505 and the E-DPCCH 506. Each of the subframes 507 in the E-DPCCH 506 carries TF information 508 indicating the TF of E-DCH data and a Happy Bit 509 in a corresponding TTI.

Figure 6:
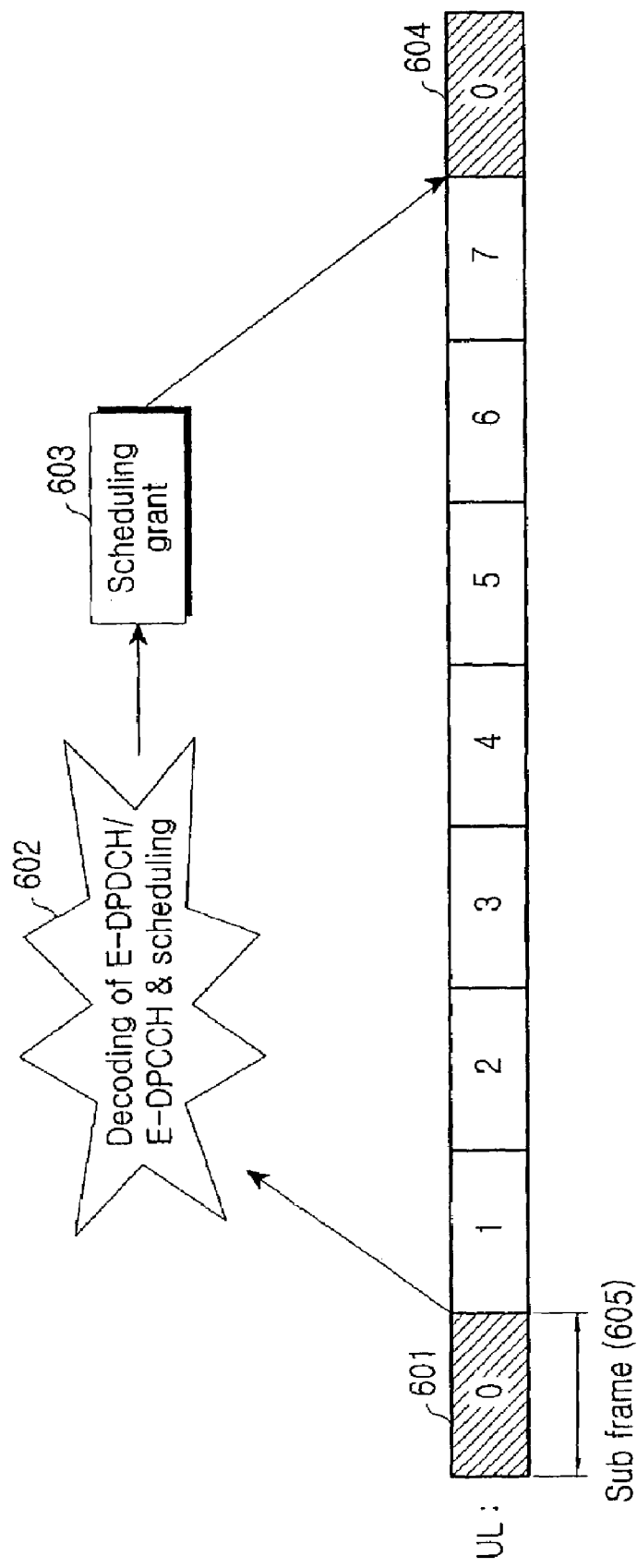
FIG. 6 is a diagram illustrating E-DCH-associated timings.

FIG. 6 is a diagram illustrating E-DCH-associated timings when the E-DCH is transmitted in 2-ms TTIs.

Referring to FIG. 6, reference numeral 605 denotes the TTI of the E-DCH. The TTI 605 is 2 ms which is equal to the length of a subframe. Upon generation of E-DCH data, the E-DCH data is transmitted on the E-DPDCH and TF information and a Happy Bit associated with the E-DCH data are transmitted on the E-DPCCH in step 601. The Happy Bit is used in scheduling for the UE in the Node B.

In step 602, the Node B detects scheduling information and the Happy bit by decoding the E-DPDCH and the E-DPCCH, respectively. The Node B notifies the UE of uplink resources allocated by scheduling in a scheduling grant in step 603. In step 604, the UE sets a Serving Grant (SG) based on the scheduling grant. The SG indicates a maximum allowed data rate (or the maximum power ratio of the E-DPDCH to the DPCCH). The UE transmits E-DCH data at a data rate (or a power ratio of the E-DPDCH to the DPCCH) equal to or less than the SG while taking its buffer status and power status into account.

A plurality of transmission and reception HARQ processes that operate in pairs in the UE and the Node B can be defined for the E-DCH, for parallel retransmission processing. Each transmission-reception HARQ process pair operates in parallel during one RRI, and packets received successfully through a retransmission procedure in a plurality of HARQ process pairs are assembled sequentially in an upper layer. FIG. 6 illustrates eight HARQ processes with processor Identifiers (IDs) 0 to 7. While the 2-ms TTIs are shown in FIG. 6, the E-DCH can use 10-m TTIs and the E-DCH operates in the 10-ms TTIs in a similar manner to the 2-ms TTIs. For the 10-ms TTIs, four HARQ processes are used in the UE or the Node B. Each HARQ process spans one subframe. Therefore, "HARQ process" and "subframe" are used interchangeably.

As described above, in transmitting E-DCH data, the UE always sets a 1-bit Happy Bit. Typically, the Happy Bit indicates whether the UE is happy with a current allowed maximum data rate. When the current data rate of the E-DCH is lower than needed according to the status of the UE and the amount of buffered data requires more resources, the UE sets the Happy Bit to "Unhappy" (such as 0) and otherwise, it sets the Happy Bit to "Happy" (such as 1).

Figure 7A:
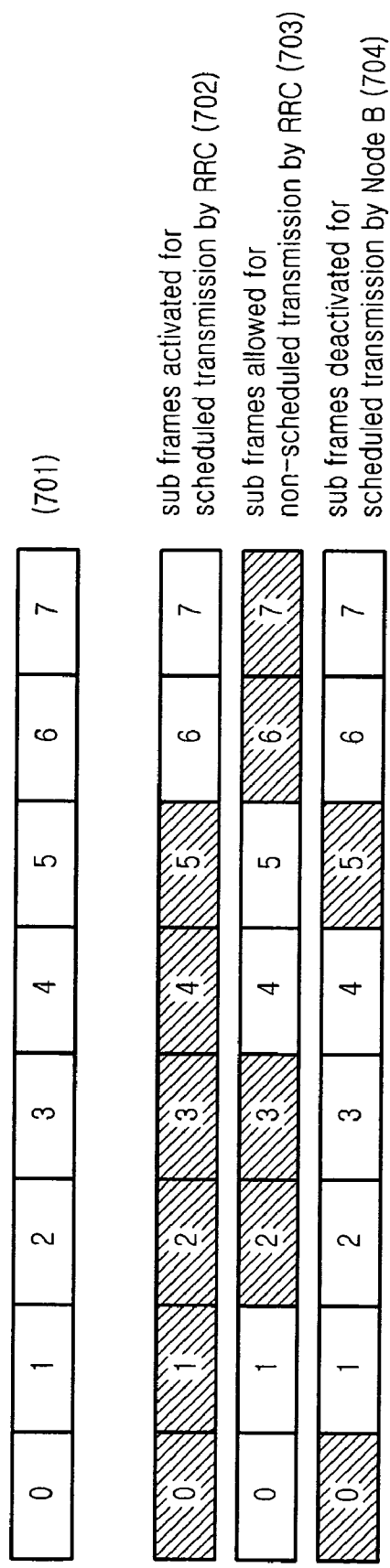
FIGS. 7A and 7B illustrate a plurality of HARQ processes according to an exemplary embodiment of the present invention.
Figure 7B:
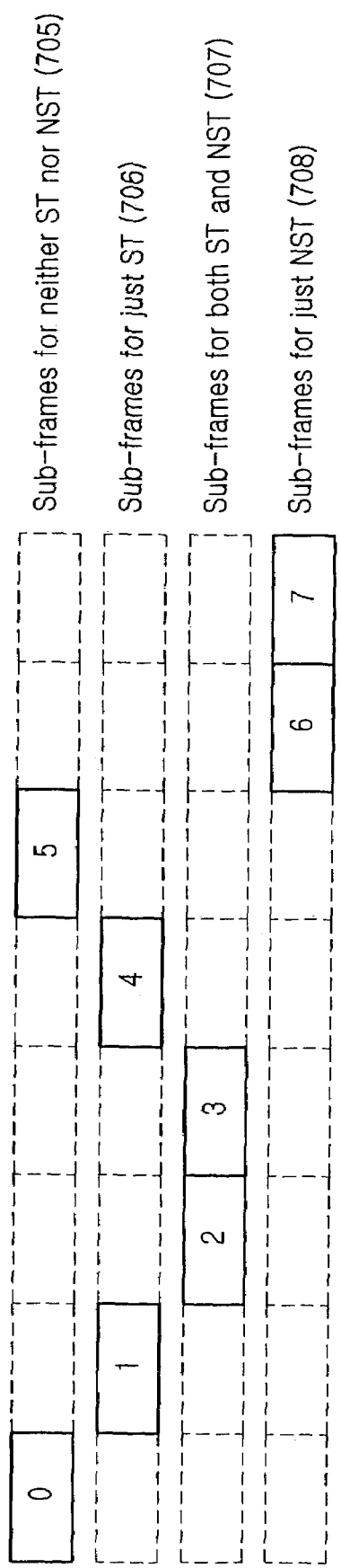

Each HARQ process may run in an ST mode based on Node B scheduling assignment information or NST mode without the scheduling assignment information. FIGS. 7A and 7B illustrate a plurality of HARQ processes according to an exemplary embodiment of the present invention. Each process can be an independent software or hardware block.

Referring to FIG. 7A, reference numeral 701 denotes eight HARQ processes with process IDs 0 to 7 for the E-DCH. The RNC establishes the E-DCH by the RRC, and sets at least one of the eight HARQ processes, for an ST and another HARQ process, for an NST. In the illustrated case of FIG. 7A, HARQ processes #0 to #5 are set for an ST, as indicated by reference numeral 702 and four HARQ processes #2, #3, #6 and #7 are set for an NST, as indicated by reference numeral 703. In this way, the same HARQ processes #2 and #3 can be used for both an ST and an NST. The UE can transmit E-DCH data in the HARQ processes #0 to #5 by an ST, and transmit E-DCH data in the HARQ processes #2, #3, #6 and #7 by an NST. The HARQ processes #0 to #5 activated for scheduled transmission are called active processes, and the other HARQ processes #6 and #7 are deactivated, called inactive processes.

The Node B can control E-DCH transmission by transmitting scheduling grants only for the active processes. However, the Node B can deactivate some of the active processes. A scheduling grant can be an Absolute Grant (AG) indicating the absolute value of an allowed maximum data rate or a Relative Grant (RG) indicating up/down/keep of an allowed maximum data rate. The AG can contain an "inactive" command. Therefore, when the Node B transmits an AG with an inactive command for a particular process to the UE, the UE does not perform scheduled E-DCH data transmission in the particular process which would be similar to the inactive processes.

For example, the Node B deactivates HARQ processes #0 and #5, as indicated by reference numeral 704. Then the UE can transmit E-DCH data by a scheduled transmission only in four HARQ processes #1 to #4. Since AGs can be transmitted for processes activated by the RNC, the Node B can flexibly change the number of HARQ processes for an ST by deciding whether a scheduled transmission is applied to the active processes, when needed.

FIG. 7B illustrates data transmission in each HARQ process set in the illustrated case of FIG. 7A. Referring to FIG. 7B, HARQ processes #0 and #5 are available for neither an ST nor an NST, as indicated by reference numeral 705. HARQ processes #1 and #4 are available for an ST only, as indicated by reference numeral 706. HARQ processes #2 and #3 are available for both an ST and an NST, as indicated by reference numeral 707. HARQ processes #6 and #7 are available for an NST only, as indicated by reference numeral 708.

Regardless of an ST or an NST, the UE transmits E-DCH data in HARQ processes, such as subframes when the E-DCH data is generated in the HARQ processes. Therefore, the Happy Bit is always delivered to the Node B in the subframes that carry the E-DCH data. The Happy Bit is set based on different criteria for an active ST process and an inactive NST process according to the transmission status of the UE.

At each E-DCH transmission, that is, in each subframe, the UE sets the Happy Bit to "Unhappy" in an active process if three specific conditions are all satisfied (criterion 1). While uplink resources are represented by a data rate in the following description, they may be represented by additional factors equivalent to the data rate (for example a power ratio of the E-DPDCH to the DPCCH).

Condition 1) The UE has adequate power available to transmit at a data rate higher than a current data rate.

Condition 2) The total buffer status would require more than a predetermined time delay (Happy_Bit_Delay_Condition) to be transmitted with the current SG × the ratio of active processes to the total number of HARQ processes.

Condition 3) The UE is transmitting the maximum amount of scheduled E-DCH data allowed by the current SG.

Condition 3 is always true for the inactive NST process and the ratio in Condition 2 is always 1 for 10-ms TTIs. Therefore, if Condition 1 or Condition 2 is not met for the inactive processes (Criterion 2), the Happy Bit is set to "Happy" because there is no current SG for the inactive NST processes. In other words, if the following two conditions are satisfied in the current subframe, the Happy Bit in the NST process is set to "Unhappy".

Condition 1) The UE has adequate power available to transmit at a higher data rate than a current data rate.

Condition 2) The total buffer status would require more than a predetermined time delay (Happy_Bit_Delay_Condition) to be transmitted with the current SG × the ratio of active processes to the total number of HARQ processes.

Since an NST data rate is generally limited by the RRC, the NST data rate is relatively low when compared to the ST data rate even though an NST is allowed for inactive processes. Therefore, in most cases, the inactive processes do not satisfy Condition 3 for the Happy Bit setting criterion of active processes.

Figure 8:
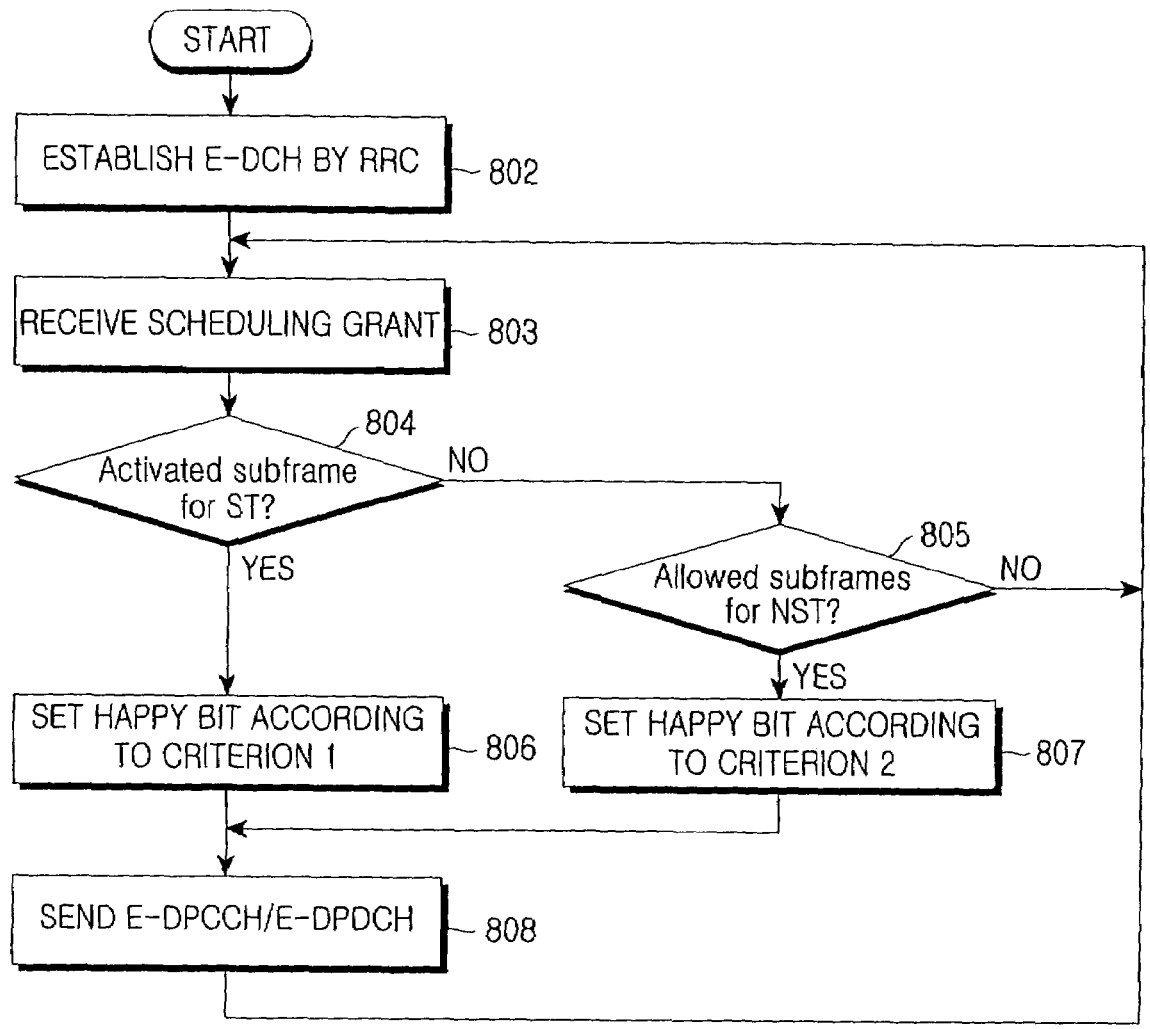
FIG. 8 is a flowchart illustrating an operation of a UE according to an exemplary embodiment of the present invention.

FIG. 8 is a flowchart illustrating an operation of a UE according to an exemplary embodiment of the present invention.

Referring to FIG. 8, the UE establishes an E-DCH by RRC signaling in step 802 and receives a scheduling grant from the Node B in step 803. In step 804, the UE determines whether an HARQ process for a current TTI is an active process for an ST. If the HARQ process is an active process, the UE proceeds to step 806. Otherwise, the UE proceeds to step 805. In step 805, the UE determines whether the current HARQ process is a process allowed for an NST. If the current HARQ process is an NST process, the UE proceeds to step 807.

Otherwise, the UE returns to step 803 without performing an operation in relation to the current HARQ process.

In step 806, the UE sets the Happy Bit of the active process according to criterion 1 involving Condition 1, Condition 2 and Condition 3. The UE generates E-DCH data for the active process and transmits the E-DCH data on the E-DPDCH in step 808. The UE typically inserts the Happy Bit in control information about the E-DCH data and transmits the control information on the E-DPCCH, simultaneously with the E-DCH data transmission. Specifically, the UE transmits the control information including the Happy Bit for the active process in an E-DPCCH subframe corresponding to an E-DPDCH subframe in which the active process is run.

In step 807, the UE sets the Happy Bit for the NST process according to criterion 2 involving Condition 1 and Condition 2. The UE generates E-DCH data for the NST process and transmits the E-DCH data on the E-DPDCH in step 808. The UE simultaneously inserts the Happy Bit in control information regarding the E-DCH data and transmits the control information on the E-DPCCH.

Figure 9A:
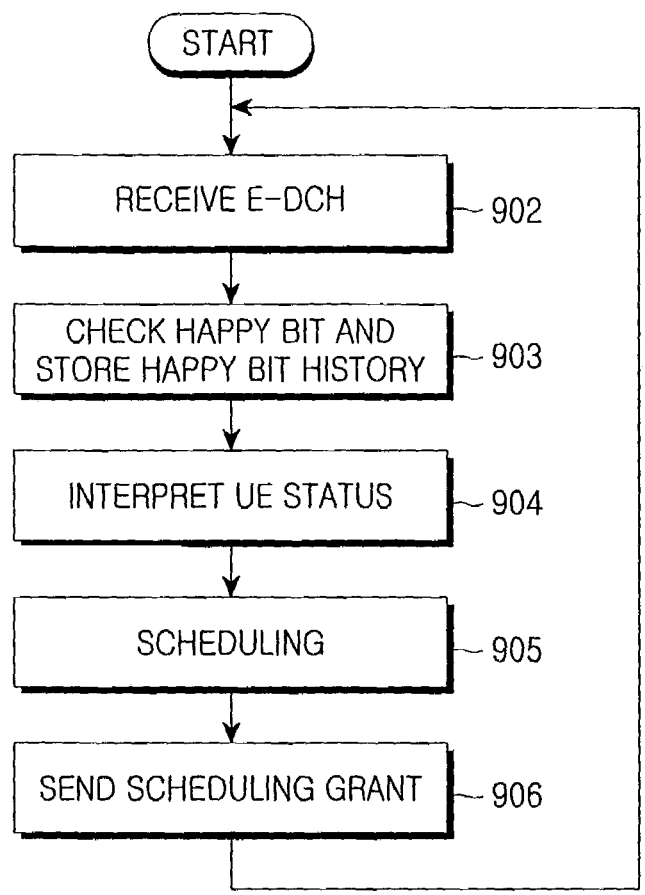
FIG. 9A is a flowchart illustrating an operation of a Node B according to an exemplary embodiment of the present invention.

The Node B interprets the Happy Bit as described below. FIG. 9A is a flowchart illustrating an operation of the Node B according to an exemplary embodiment of the present invention.

Referring to FIG. 9A, the Node B simultaneously receives E-DCH data on the E-DPDCH and E-DCH control information on the E-DPCCH in step 902. The control information includes TF information of the E-DCH data and a Happy Bit. In step 903, the Node B interprets the Happy Bit and stores the Happy Bit with respect to a corresponding HARQ process in a memory. When Happy Bits are received subframes corresponding to the number of HARQ processes of the UE, the Node B interprets the current status of the UE by using a Happy Bit history of the stored Happy Bits in step 904. For example, the UE's current status may be interpreted as follows.

TABLE 1

| Inactive process & NST process | Active process | UE status |
| --- | --- | --- |
| Happy | Happy | The UE wants to maintain the SG and the number of active processes. |
| Happy | Unhappy | The UE wants to increase the number of active processes, without the need for increasing the SG. |
| Unhappy | Happy | Almost impossible |
| Unhappy | Unhappy | The UE wants to increase the SG or increase the number of active processes |

The Node B schedules for the UE are based on the interpreted UE status in step 905. The Node B notifies the UE of the scheduling result by a scheduling grant in step 906. The Node B may use AGs or RGs to increase or decrease SGs for active processes set for the UE, and use AGs to increase or decrease the number of the active processes. After step 906, the Node B returns to step 902.

Even if the Node B intends to increase the number of active processes for the UE according to the Happy Bits, the Node B cannot increase the number of active processes using AGs if RNC-set active processes have already been activated. According to an exemplary implementation, the RNC can increase the number of active processes. Thus, the Node B transmits a control signal to the RNC, requesting the increase of the number of active processes so that the RNC can increase the number of active processes.

Figure 9B:
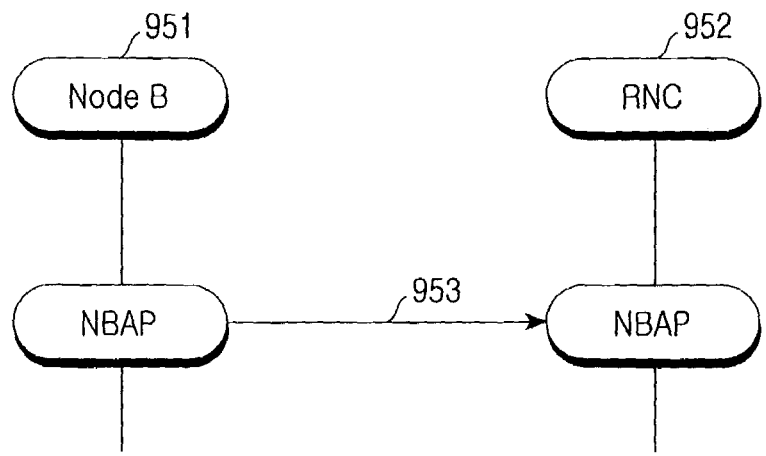
FIG. 9B is a diagram illustrating signaling from the Node B to an RNC according to an exemplary embodiment of the present invention.

FIG. 9B is a diagram illustrating signaling from the Node B to the RNC to request the increase (or decrease) of active processes in number for the UE according to an exemplary embodiment of the present invention.

Referring to FIG. 9B, a Node B 951 transmits a control signal 953 to an RNC 952 requesting the change of an active process status for the UE by Node B Application Part (NBAP) signaling (or user-plane signaling). If the Node B determines from the Happy Bits that the UE desires to increase the number of active processes, it verifies whether there is any deactivated process among RNC-set active processes. If none of the RNC-set active processes are deactivated, the Node B cannot increase the number of active processes. Thus, the Node B 951 transmits the control signal 953 to the RNC 952 and the RNC 952 sets additional active processes for the UE in response to the control signal 953. Then the RNC 952 notifies the UE of the increased active processes by RRC signaling. Additional reception active processes are set for the Node B in correspondence with the added active processes.

Figure 10:
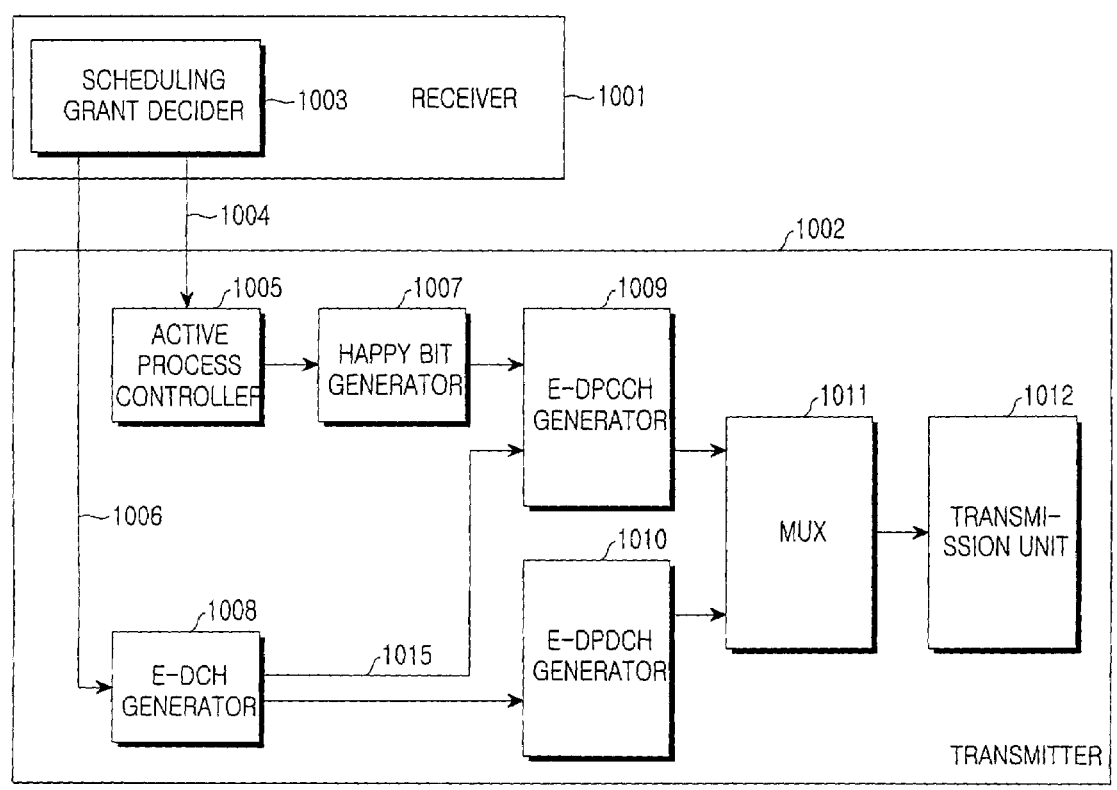
FIG. 10 is a block diagram of the UE according to an exemplary embodiment of the present invention.

FIG. 10 is a block diagram of the UE according to an exemplary embodiment of the present invention.

Referring to FIG. 10, reference numeral 1001 denotes a reception unit. A scheduling grant decider 1003 in the reception unit 1001 interprets a scheduling grant received from the Node B. The interpretation is achieved by identifying the scheduling grant as an AG or an RG. The scheduling grant decider 1003 provides an activation/deactivation command 1004 for active processes according to the interpretation result to an active process controller 1005 in a transmission unit 1002. An SG generated from the scheduling grant decider 1003 represents an allowed maximum data rate updated according to the AG or the RG. The SG is provided to an E-DCH generator 1008 for use in adjusting the data rate of the E-DCH.

The active process controller 1005 set a Happy Bit for a current HARQ process by using a different criterion (criterion 1 or criterion 2) depending on whether the current HARQ process is an active process or an NST process by controlling a Happy Bit generator 1007. The Happy Bit is set by the Happy Bit generator 1007 and TF information 1015 of the E-DCH generated from the E-DCH generator 1008 form control information. An E-DPDCH generator 1010 constructs an E-DPDCH frame with the E-DCH data generated from the E-DCH generator 1008. The control information formed in an E-DPCCH generator 1009 and the E-DPDCH frame generated from the E-DPDCH generator 1010 are multiplexed in a multiplexer (MUX) 1011 and transmitted on the uplink through a transmission unit 1012. The Happy Bit generator 1007 and the E-DPCCH generator 1009 form a control channel transmitter, and the E-DCH generator 1008 and the E-DPDCH generator 1010 form a data channel transmitter.

Figure 11:
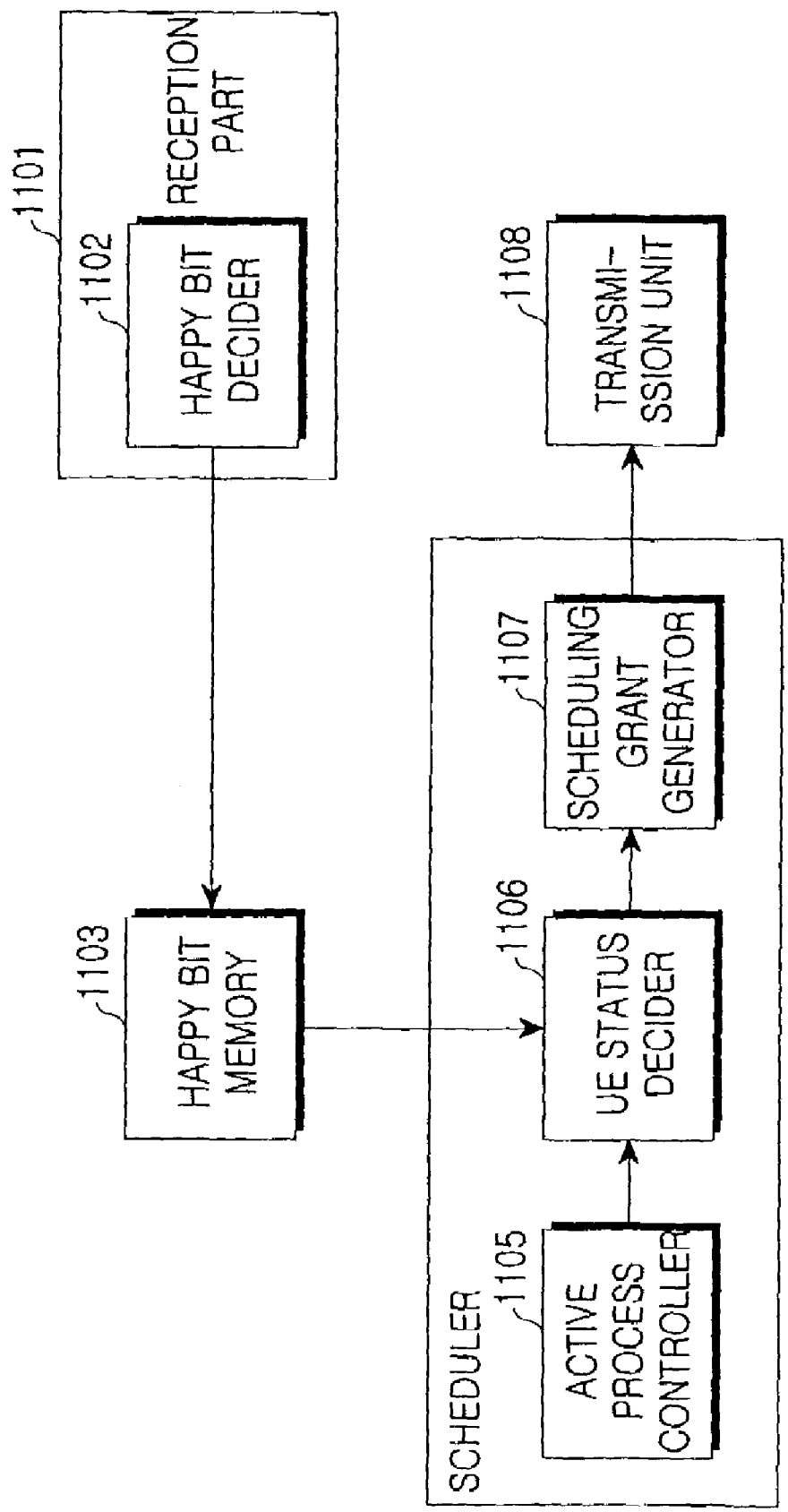
FIG. 11 is a block diagram of the Node B according to an exemplary embodiment of the present invention.

FIG. 11 is a block diagram of the Node B according to an exemplary embodiment of the present invention.

Referring to FIG. 11, a receiver 1101 is provided with reception HARQ processes corresponding to transmission HARQ processes of the UE. The receiver 1101 receives E-DCH data on the E-DPDCH and simultaneously controls information including TF information of the E-DCH data and Happy bits on the E-DPCCH, in the reception HARQ processes. A Happy Bit decider 1102 in a reception unit 1101 detects the Happy Bits from the control information and stores them in a Happy Bit memory 1103. The Happy Bit memory 1103 stores the Happy Bits and provides the Happy Bit history of the Happy Bits to a UE status decider 1106. The Happy Bit history includes the Happy Bits for the HARQ processes of the UE.

In a scheduler 1004, the UE status decider 1106 decides the status of the UE in the manner illustrated in Table 1 using the Happy Bit history read from the Happy Bit memory 1103 and process status information received from an active process controller 1105. The process status information indicates whether each HARQ process is an active process, an inactive process, or an NST process. The UE status decider 1106 decides UE status information according to the process status information by determining whether the Happy bit for each HARQ process is "Unhappy" or "Happy" and provides the UE status information to a scheduling grant generator 1107. The UE status information indicates one of the states depicted in Table 1, for example.

The scheduling grant generator 1107 generates a scheduling grant indicating an allowed maximum data rate for the UE, based on the UE status information, scheduling information received from the UE, and uplink resources and transmits the scheduling grant to the UE through a transmission unit 1108. The scheduling grant is an AG or an RG.

If it is necessary to change the number of active processes for the UE according to the UE status information, the active process controller 1105 receives the UE status information from the UE status decider 1106 and transmits a control signal requesting the change of the number of active processes for the UE to the RNC. Then the active process controller 1005 can set additional active processes for the UE under the control of the RNC.

In accordance with an exemplary embodiment of the present invention as described above, a Happy Bit representing the status of an HARQ process of a UE is set according to a different criterion for the type of the HARQ process and for uplink packet transmission in a WCDMA communication system supporting the E-DCH. Since a different setting criterion is applied to the Happy Bit depending on whether the HARQ process is activated or deactivated, scheduling of uplink packet transmission becomes effective.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting control information for uplink data transmission in a User Equipment (UE), comprising:
   determining whether status of a current process to deliver uplink data on an Enhanced Uplink Dedicated Channel (E-DCH) is set as one of active and inactive;
   determining whether the current process meets a set of predetermined criteria in order to set a happy bit;
   setting the happy bit to "unhappy", if all of the predetermined criteria are met, the happy bit taking on either an unhappy state value or a happy state value, each state value indicating respectively whether the UE is able to use more resources or not; and
   transmitting control information comprising the happy bit to a Node B on an Enhanced-Dedicated Physical Control Channel (E-DPCCH) associated with an Enhanced-Dedicated Physical Data Channel (E-DPDCH), with transmission of the uplink data on the E-DPDCH,
   wherein, if the current process is active, the set of predetermined criteria includes (i) the UE has adequate power available to transmit at a higher data rate than a current data rate, (ii) a total buffer status in the UE indicates that the UE requires more than a predetermined time delay to transmit data in the buffer, and (iii) the UE is transmitting E-DCH data at an allowed maximum data rate indicated by a serving grant, and
   if the current process is inactive, the set of predetermined criteria includes (iv) the UE has adequate power available to transmit at a higher data rate than a current data rate, (v) a total buffer status in the UE indicates the UE requires more than a predetermined time delay to transmit data in the buffer, and (vi) a condition of the UE transmitting E-DCH data at an allowed maximum data rate indicated by a serving grant is always true.

2. The method of claim 1, wherein the current process set as active is set by a Radio Network Controller (RNC) that controls radio resources for the UE by Radio Resource Control (RRC) signaling, and not indicated as inactive by an Absolute Grant (AG) representing an allowed maximum data rate sent by the Node B.

3. The method of claim 1, wherein the current process set as inactive is set by the RNC by RRC signaling.

4. The method of claim 1, wherein the current process comprises a Hybrid Automatic Repeat request (HARQ) process operating for a Transport Time Interval (TTI).

5. A method of receiving control information of a User Equipment (UE) for uplink data transmission, comprising:
   receiving control information comprising a happy bit associated with transmission of the uplink data from the UE;
   storing the happy bit comprised in the control information with respect to a process in which the uplink data has been received, the happy bit taking on either an unhappy state value or a happy state value, each state value indicating respectively whether the UE is able to use more resources or not, the happy bit being set to "unhappy" if all of a predetermined criteria are met;
   determining an allowed maximum data rate and a number of active processes using happy bits stored with respect to a plurality of processes with the UE; and
   scheduling uplink data transmission for the UE according to the determined allowed maximum data rate and the determined number of active processes, and transmitting a scheduling grant indicating a scheduling result to the UE,
   wherein, if the process corresponding to the happy bit is active, the predetermined criteria include (i) the UE has adequate power available to transmit at a higher data rate than a current data rate, (ii) a total buffer status in the UE indicates that the UE requires more than a predetermined time delay to transmit data in the buffer, and (iii) the UE is transmitting Enhanced Uplink Dedicated Channel (E-DCH) data at an allowed maximum data rate indicated by a serving grant, and
   if the process corresponding to the happy bit is inactive, the predetermined criteria include (iv) the UE has adequate power available to transmit at a higher data rate than a current data rate, (v) a total buffer status in the UE indicates that the UE requires more than a predetermined time delay to transmit data in the buffer, and (vi) a condition of the UE transmitting Enhanced Uplink Dedicated Channel (E-DCH) data at an allowed maximum data rate indicated by a serving grant is always true.

6. The method of claim 5, wherein the process set as active is set by a Radio Network Controller (RNC) that controls radio resources for the UE by Radio Resource Control (RRC) signaling, and not indicated as inactive by an Absolute Grant (AG) representing an allowed maximum data rate sent by the Node B.

7. The method of claim 5, wherein the process set as inactive is set by the RNC by RRC signaling.

8. The method of claim 5, wherein the determining comprises determining to maintain the allowed maximum data rate and the number of active processes for the UE, if happy bits with respect to the plurality of processes with the UE are all set to "happy".

9. The method of claim 5, wherein the determining comprises determining to increase the number of active processes without increasing the allowed maximum data rate for the UE, if a happy bit with respect to one of the plurality of processes with the UE is set to "unhappy".

10. The method of claim 5, wherein the determining comprises determining to increase at least one of the allowed maximum data rate and the number of active processes for the UE, if a happy bit with respect to one of the plurality of processes with the UE is set to "unhappy".

11. The method of claim 5, further comprising the transmitting of a control signal requesting the change of the number of active processes for the UE to the RNC, in order to change the number of active processes for the UE.

12. The method of claim 5, wherein the process comprises a Hybrid Automatic Repeat request (HARQ) process operating for a Transport Time Interval (TTI).

13. An apparatus for transmitting control information for uplink data transmission in a User Equipment (UE), comprising:
an active process controller for determining whether status of a current process to deliver uplink data on an Enhanced Uplink Dedicated Channel (E-DCH) is set as one of active and inactive;
a controller information decider for determining whether the current process meets a set of predetermined criteria in order to set a happy bit, and for setting the happy bit to "unhappy", if all of the predetermined criteria are met, the happy bit taking on either an unhappy state value or a happy state value, each state value indicating respectively whether the UE is able to use more resources or not;
a data channel transmitter comprising a plurality of processes for transmitting uplink data on the E-DCH, for transmitting the uplink data on an Enhanced-Dedicated Physical Data Channel (E-DPDCH); and
a control channel transmitter for transmitting control information comprising the happy bit to a Node B on an Enhanced-Dedicated Physical Control Channel (E-DPCCH) associated with an Enhanced-Dedicated Physical Data Channel (E-DPDCH),
wherein, if the current process is active, the set of predetermined criteria includes (i) the UE has adequate power available to transmit at a higher data rate than a current data rate, (ii) a total buffer status in the UE indicates that the UE requires more than a predetermined time delay to transmit data in the buffer, and (iii) the UE is transmitting E-DCH data at an allowed maximum data rate indicated by a serving grant, and
if the current process is inactive, the set of predetermined criteria includes (iv) the UE has adequate power available to transmit at a higher data rate than a current data rate, (v) a total buffer status in the UE indicates that the UE requires more than a predetermined time delay to transmit data in the buffer, and (vi) a condition of the UE, transmitting E-DCH data at an allowed maximum data rate indicated by a serving want is always true.

14. The apparatus of claim 13, wherein the current process set as active is set by a Radio Network Controller (RNC) that controls radio resources for the UE by Radio Resource Control (RRC) signaling, and not indicated as inactive by an Absolute Grant (AG) representing an allowed maximum data rate sent by the Node B.

15. The apparatus of claim 13, wherein the current process set as inactive is set by the RNC by RRC signaling.

16. The apparatus of claim 13, wherein the current process comprises a Hybrid Automatic Repeat request (HARQ) process operating for a Transport Time Interval (TTI).

17. An apparatus for receiving control information of a User Equipment (UE) for uplink data transmission in a Node B, comprising:
a receiver for receiving control information comprising a happy bit associated with transmission of the uplink data from the UE;
a memory for storing the happy bit comprised in the control information with respect to a process in which the uplink data has been received, the happy bit taking on either an unhappy state value or a happy state value, each state value indicating respectively whether the UE is able to use more resources or not, the happy bit being set to "unhappy" if all of a predetermined criteria are met;
a UE status decider for determining an allowed maximum data rate and a number of active processes using happy bits stored with respect to a plurality of processes with the UE;
a scheduling grant generator for scheduling uplink data transmission for the UE according to the determined allowed maximum data rate and the determined number of active processes, and generating a scheduling grant indicating a scheduling result; and
a transmitter for transmitting the scheduling grant to the UE,
wherein, if the process corresponding to the happy bit is active, the predetermined criteria include (i) the UE has adequate power available to transmit at a higher data rate than a current data rate, (ii) a total buffer status in the UE indicates that the UE requires more than a predetermined time delay to transmit data in the buffer, and (iii) the UE is transmitting Enhanced Uplink Dedicated Channel (E-DCH) data at an allowed maximum data rate indicated by a serving grant, and
if the process corresponding to the happy bit is inactive, the predetermined criteria include (iv) the UE has adequate power available to transmit at a higher data rate than a current data rate, (v) a total buffer status in the UE indicates that the UE requires more than a predetermined time delay to transmit data in the buffer, and (vi) a condition of the UE transmitting Enhanced Uplink Dedicated Channel (E-DCH) data at an allowed maximum data rate indicated by a serving grant is always true.

18. The apparatus of claim 17, wherein the process set as active is set by a Radio Network Controller (RNC) that controls radio resources for the UE by Radio Resource Control (RRC) signaling, and not indicated as inactive by an Absolute Grant (AG) representing an allowed maximum data rate sent by the Node B.

19. The apparatus of claim 17, wherein the process is set by the RNC by RRC signaling.

20. The apparatus of claim 17, wherein the UE status decider determines to maintain the allowed maximum data rate and the number of active processes for the UE, if happy bits with respect to the plurality of processes with the UE are all set to "happy".

21. The apparatus of claim 17, wherein the UE status decider determines to increase the number of active processes without increasing the allowed maximum data rate for the UE, if a happy bit with respect to one of the plurality of processes with the UE is set to "unhappy".

22. The apparatus of claim 17, wherein the UE status decider determines to increase the allowed maximum data rate or to increase the number of active processes for the UE, if a happy bit with respect to one of the plurality of processes with the UE is set to "unhappy".

23. The apparatus of claim 17, further comprising an active process controller for controlling a plurality of processes set between the Node B and the UE and transmitting a control signal requesting the change of the number of active processes for the UE to the RNC, in order to change the number of active processes for the UE.

* * * * *